H. P. AMPHLETT AND E. L. JONES.
MOLDING OF OBJECTS BY MEANS OF CENTRIFUGAL FORCE.
APPLICATION FILED MAR. 14, 1922.

1,427,508.

Patented Aug. 29, 1922
2 SHEETS—SHEET 2.

Inventors
H. P. Amphlett
E. L. Jones
By Marks & Clerk
Attys.

UNITED STATES PATENT OFFICE.

HERBERT PAUL AMPHLETT AND EDWIN LANDSEER JONES, OF VICTORIA, LONDON, ENGLAND, ASSIGNORS TO THE HUME PIPE AND CONCRETE CONSTRUCTION COMPANY, LIMITED, OF LONDON, ENGLAND.

MOLDING OF OBJECTS BY MEANS OF CENTRIFUGAL FORCE.

1,427,508.    Specification of Letters Patent.    Patented Aug. 29, 1922.

Application filed March 14, 1922. Serial No. 543,742.

*To all whom it may concern:*

Be it known that we, HERBERT PAUL AMPHLETT, a subject of the King of Great Britain and Ireland, and EDWIN LANDSEER JONES, a subject of the King of Great Britain and Ireland, and both residing at 7c, Lower Belgrave Street, Victoria, London, S. W. 1, England, have invented certain new and useful Improvements in or Relating to the Molding of Objects by means of Centrifugal Force, of which the following is a specification.

This invention relates to molding by centrifugal action in rotating moulds as carried into effect, say for example, in the molding of various products from concrete, vitreous material, metal or other substances.

For such purpose it is common to convey to a machine one after another moulds prepared, say, by the insertion of reinforcement or in other ways for the reception of the material to be moulded, in which machine the moulds are rotated while they are charged and in many cases other operations occupying perhaps a considerable amount of time are conducted thereon.

For rotating the moulds driving or gripping means is necessary and for rapid successive positioning and manipulation a frictional drive has been found to give good results. A sufficient area of contact and intensity of pressure is however essential if the speed of the mould is to respond satisfactorily to variations in the speed of the driving machine.

The output from any given rotating or driving machine is limited by the speed at which moulds can be positioned therein and removed therefrom and one or more attendants working on a machine may remain unoccupied for periods during which rotation must continue although no manipulative operations are proceeding. Further, a single attendant or group of attendants will be called upon to carry out on the same mould or product several different operations or steps of a process, which operations or steps might be more effectively performed if each were carried out by a separate individual or individuals who would separately perform the same operation upon one mould after another in rapid succession.

The object of the present invention is to improve the methods of and means for molding objects from material under the action of centrifugal force and to remove objections such as above mentioned.

The invention consists in a machine, carriage or other device for supporting and rotating a molding casing, said device having one or more flexible depending moving members as, for example, endless bands, which operate to suspend and at the same time impart rotational movement to a mould or moulds.

The invention also consists in a continuous process for molding objects by means of centrifugal force in a series of moulds, each supported by a driving or operating carriage or the like according to the preceding paragraph in which the carriage is movable so that a mould is transported thereby from one to another of a series of locations where different operations or steps of the process are carried out.

The invention further consists in apparatus for molding objects by means of centrifugal force and comprising a plurality of molding casings, a plurality of carriages or the like each having means for supporting and rotating a molding casing and means for guiding said carriages each with a casing one after another through a series of movements so that various operations or steps of a continuous process may be executed in succession.

The invention also consists in the improvements in or relating to the molding of objects by means of centrifugal force as hereinafter described.

Referring now to the accompanying more or less diagrammatic drawings:—

Figure 1:
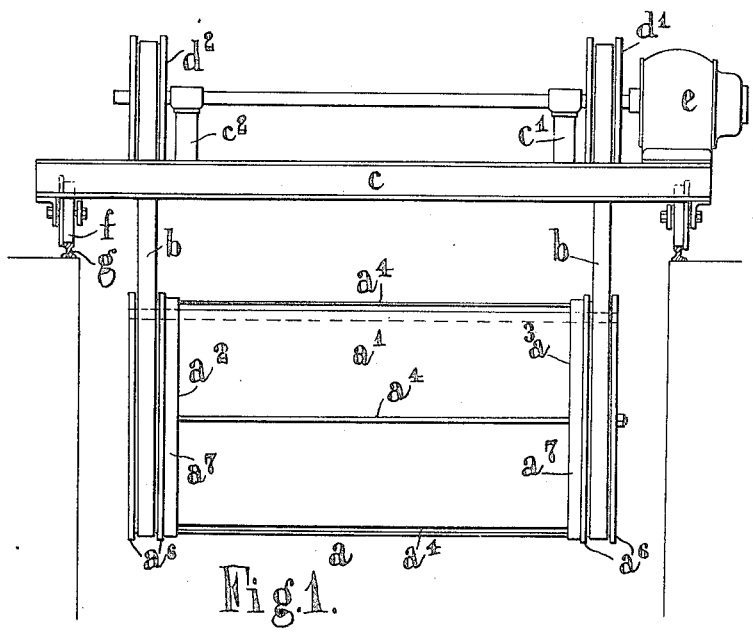
Figure 1 shows in side elevation a driving machine or carriage with a mould suspended therefrom.
Figure 2:
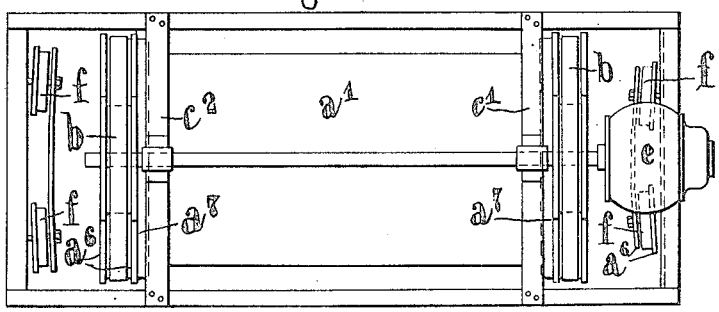
Figure 2 is a plan view.
Figure 3:
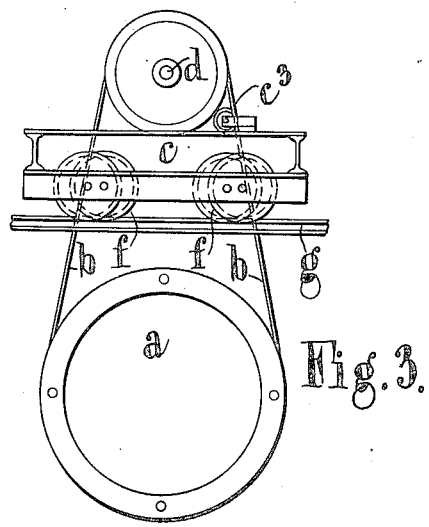
Figure 3 is an end view of the apparatus shown in Figure 1.

In the convenient embodiment of the invention shown by way of example in the drawings, molding casings $a$ are provided in any convenient number and each, say, comprising a shell or the component parts thereof $a'$, fitted with end retaining rings $a^2$, $a^3$, which are readily detachable for quickly dismantling and reassembling a mould say by means of longitudinal bolts $a^4$. At each end of the mould there is provided conveniently upon the retaining rings, a pair of parallel flanges $a^6$ forming a guide-way for a belt $b$ or like slinging and driving means. Adjacent to these guideways and conveniently upon the inner side thereof are other track-ways $a^7$ for enabling the moulds to be transported by rolling upon a line of double rails or the like.

The machine or carriage for supporting and rotating a mould consists of a platform or frame $c$ carrying in bearings $c'$, $c^2$ a suitable longitudinal shaft $d$, upon which are fastened a pair of driving pulleys $d'$, $d^2$, adapted to carry the depending belts $b$ which will encircle the guide-ways formed between the flanges $a^6$ of the molding casing $a$ and thus support the casing from the carriage, means such for example as a jockey pulley $c^3$ being, if desired, provided for one or both belts to level and steady the casing if necessary.

Controllable driving means, say in the form of an electric motor $e$, is also provided for the longitudinal shaft $d$ by means of which said shaft may be rotated at convenient speeds for the purpose of driving the hanging molding casing $a$ by means of the depending belts $b$. The carriage or frame $c$ may be fixed or movable and in the latter case it may be provided at each end with flanged or like trolley wheels $f$ adapted to run upon rails $g$ which may be positioned as hereinafter described.

When it is desired to carry out a continuous process with a plurality of carriages and moulds an overhead circular track of double rails $g$ is provided at a convenient position around which the supporting and driving carriages may travel upon their trolley wheels $f$, and leading to and away from the circular track sets of double rails $h$, $h'$ are provided upon which the moulds $a$ may be transported by rolling, say from an assembling yard, and after completion to a steaming or annealing chamber, seasoning ground or other suitable locations.

Figure 4:
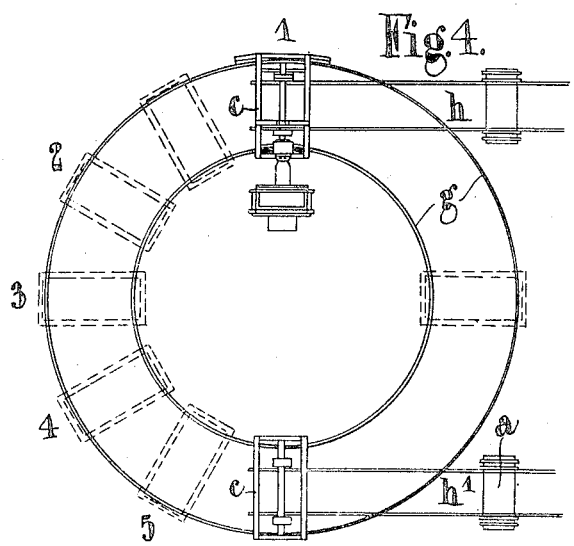
Figure 4 is a plan of a circular track with molding carriages in position thereon for carrying on a continuous molding process.

A circular track $g$ or other support for a carriage or carriages is fixed at such a distance above the mould transporting rails $h\ h'$ that a mould, when supported on the transporting rails, is in a convenient position beneath the carriage for the depending belts $b$ to be slipped over the flanges $a^6$ on to the guide-ways and for a circular track the transporting rails $h\ h'$ for incoming and outgoing moulds are preferably brought in to terminate below the circular track, say at two diametrically opposite points or at some other positions preferably closer together, so as to utilize as much as possible of the circular track. The ends of the transporting rails $h\ h'$ may be inclined downwards for a suitable distance from their termination, so that when the depending belts $b$ have been placed upon a mold, movement of the carriage will free the mould from the transporting rails or in the case of a mould which is being removed from the supporting carriage it will be run on to the inclined ends of the rails until they support it and the belts may be removed from between the flanges $a^6$. As soon as the mould is suspended from the overhead carriage $c$ the motor $e$ is started and the mould $a$ rotated by means of the longitudinal shaft $d$ and depending belts $b$ and in this condition it is filled with the material to be moulded, such an concrete or any other substance. When a circular track is employed the filling means are positioned at such a suitable location with regard to the circular track that the moulds may be filled as soon as they are in a condition of being properly supported and rotated say, at the position marked 1 in Figure 4. When the mould is filled, the overhead carriage is moved farther along the circular track to positions 2, 3, 4—for other operations such, for example, as spinning to consolidate the concrete, removal of water, barring or otherwise treating the surfaces and any final finishing operations which may be necessary before the rotation of the mould is finally stopped.

As one mould supported upon its carriage leaves the filling apparatus, another will take its place, the circular track-way and number of overhead carriages thereon being so proportioned that the necessary time is given for each mould to remain stationary at a desired location, where it is operated upon by suitable appliances manipulated by an attendant or attendants who preferably perform only the single operation upon the moulds so that the process is divided up into a number of separate operations or steps, each of which may be performed in the smallest possible amount of time, either by suitable mechanism and/or attendants trained especially for the one operation.

As soon as the whole of the operations of the process have been performed, the mould is run on to the outgoing rails and the depending belts removed therefrom, the overhead carriage passing round the remainder of the track to again take up a mould from the incoming rails.

Instead of the carriages and suspended moulds moving intermittently around the track it may, if desired, be arranged that some or all of the operations are performed thereon during a continuous slow progression, mechanism or attendants for performing the various operations being arranged to move the necessary distance for completing the operation and returning again to recommence the same operation on the next mould.

Instead of sloping or inclining the ends of the rails as described, the ends may be movable upward and downward, in order to effect the engagement and disengagement of the moulds with the depending belts. This arrangement is particularly advantageous for a machine or carriage which occupies a more or less fixed position.

The hereinbefore mentioned molding cases or moulds include casings or shells which may remain as a part of the completed product as for example, where metal or like tubes are given a permanent lining of cement or other material.

Although a continuous process is herein described in connection with an overhead circular track, it is to be understood that this feature of the invention is not limited thereto and that this scheme may also be applied to the transference of other centrifugal machines on circular or returning tracks on, above or below the floor level for the purpose of continuous manufacture, when employed for a straight track switching arrangements being made at each end of the operating section for a parallel return track. It is also to be understood that the feature of suspending the mould from a driving member or belt is in no way restricted to its use in a continuous process and that it may be employed for stationary molding machines and/or for a series of moulds on one machine.

Other additions and modifications may also be introduced without in any way departing from the spirit of this invention.

Having now described our invention what we claim as new and desire to secure by Letters Patent is:—

1. Apparatus for carrying out a continuous process of molding objects by centrifugal force comprising in combination an elevated trackway, a plurality of bogies thereon, a plurality of molding casings and means on each bogie for rotatably suspending one of said casings.

2. Apparatus for carrying out a continuous process of molding objects by means of centrifugal force comprising in combination a series of moulds, a device for supporting and rotating each of said moulds, said device being movable so that a mould is transported thereby from one to another of a series of locations where different operations or steps of the process are carried out.

3. Apparatus for carrying out a continuous process of molding objects by means of centrifugal force and comprising in combination a plurality of molding casings, a plurality of wheeled carriages each having common means for supporting and rotating a molding casing and common means for guiding all of said carriages each with a casing one after another through a series of movements so that various operations or steps of a continuous process may be executed in succession.

4. Apparatus for carrying out a continuous process of molding objects such, for example, as pipes by centrifugal force, comprising in combination a plurality of independent bogies, a power shaft on each bogie, means for supporting and driving the same, circular driving elements carried by said shaft, endless flexible moving members depending as loops from said driving elements, a centrifugal molding casing supported in said loops and driven by said moving members, and common means for supporting and guiding said bogies whereby said casings may be transported to a series of determined positions.

5. Apparatus for molding objects such, for example, as pipes by centrifugal force, comprising in combination a power shaft, a wheeled structure supporting said shaft, circular driving elements carried by said shaft, endless flexible moving members depending as loops from said driving elements, a centrifugal molding casing supported in said loops and driven by said moving members, and a trackway for said wheeled structure whereby said molding casing is transported to a series of determined locations.

6. Apparatus for molding objects such, for example, as pipes by centrifugal force, comprising in combination a rotatable shaft, a bogie upon which said shaft is rotatably supported, means for driving said shaft carried by said bogie, a circular driving element carried by said shaft, an endless flexible moving member depending as a loop from said driving element, a centrifugal molding casing supported in said loop and driven by said moving member, and a trackway upon which said bogie is movable with said molding casing suspended therefrom.

7. Apparatus for molding objects such, for example, as pipes by centrifugal force, comprising in combination a rotatable shaft, a bogie upon which said shaft is rotatably supported, means for driving said shaft carried by said bogie, a circular driving element carried by said shaft, an endless flexible moving member depending as a loop from said driving element, a centrifugal molding casing supported in said loop and driven by said moving member, and a circular trackway upon which said bogie, with the suspended molding casing, is movable to a series of different locations.

8. Apparatus for molding objects such, for example, as pipes by centrifugal force, comprising in combination a circular driving element, a bogie having means for supporting and driving the same, an endless flexible moving member depending as a loop from said driving element, a centrifugal molding casing supported in said loop and driven by said moving member, a trackway on which said bogie is movable to a series of locations and means for transporting a series of molding casings to one of said locations and removing them from another.

In testimony whereof we have signed our names to this specification.

HERBERT PAUL AMPHLETT.
EDWIN LANDSEER JONES.